US010994590B2

(12) United States Patent
Kister

(10) Patent No.: US 10,994,590 B2
(45) Date of Patent: *May 4, 2021

(54) REMOTELY OPERATED SUN VISOR

(71) Applicant: Talfred Tim Kister, Apache Junction, AZ (US)

(72) Inventor: Talfred Tim Kister, Apache Junction, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/077,972

(22) Filed: Oct. 22, 2020

(65) Prior Publication Data

US 2021/0039483 A1 Feb. 11, 2021

Related U.S. Application Data

(63) Continuation-in-part of application No. 16/696,496, filed on Nov. 26, 2019, now Pat. No. 10,843,534.

(60) Provisional application No. 62/771,887, filed on Nov. 27, 2018.

(51) Int. Cl.
*B60J 3/02* (2006.01)
(52) U.S. Cl.
CPC .................................. *B60J 3/0226* (2013.01)
(58) Field of Classification Search
CPC ............................. B60J 3/0217; B60J 3/0226

USPC ......................... 296/97.4, 97.12, 97.9, 97.13
See application file for complete search history.

(56) References Cited

U.S. PATENT DOCUMENTS

| 4,987,315 A | * | 1/1991 | Abu-Shumays | ....... B60J 3/0208 |
| | | | | 296/97.11 |
| 5,350,212 A | * | 9/1994 | Corn | ....... B60J 3/0208 |
| | | | | 296/97.11 |
| 2001/0005088 A1 | * | 6/2001 | Hennessey | ............. B60J 3/0217 |
| | | | | 296/97.1 |

* cited by examiner

*Primary Examiner* — Joseph D. Pape

(57) ABSTRACT

A remotely operated sun visor is disclosed. The visor includes first and second rotational mechanisms, a sun visor body, controller unit, and power switch. The first rotational mechanism is affixed to and oriented perpendicular to the second rotational mechanism. The sun visor body is torsionally coupled to the first rotational mechanism which thereby rotates the sun visor body about a first axis when activated. The vehicle mounting plate is torsionally coupled to the second rotational mechanism, which thereby rotates the sun visor body about a second axis when activated. The first axis is oriented perpendicular to the second axis. The first and second rotational mechanisms are each communicatively coupled to the controller unit. The first and second rotational mechanisms are positioned within a motor housing. The first rotational mechanism includes a first rod and a second rod positioned opposite the first rod. The second rotational mechanism includes a third rod.

19 Claims, 11 Drawing Sheets

REMOTELY OPERATED SUN VISOR

CROSS-REFERENCE TO RELATED APPLICATIONS

This application is a continuation of U.S. patent application Ser. No. 16/696,496 filed Nov. 26, 2019, which claims priority to U.S. Provisional Application No. 62/771,887 filed Nov. 27, 2018, which are hereby incorporated herein by reference.

FIELD OF THE INVENTION

The present disclosure relates generally to sun visors. More specifically, the present disclosure describes remotely operated sun visors.

BACKGROUND OF THE INVENTION

Driving in the sun may be an enjoyable experience, but it can also lead to a hazard if the driver's view is compromised by a glaring sun. This glare can make it much more difficult to see the road ahead and potential hazards, leading to an increased likelihood of accidents. Sun visor is an effective apparatus to protect the driver or front passenger from sun rays, such that the sun does not shine directly into the occupants' eyes. Almost every automobile is equipped with at least two sun visors that are positioned adjacent to a top portion of the windshield, one at the driver's side and another at the front passenger's side. Under certain lighting conditions, the driver may deploy the sun visor by rotating the sun visor about a rotational axis from a non-deployed position to a deployed position to prevent part of light transmission from entering the cabin, thereby enabling the driver to focus on vehicle operations.

However, the occupants have to manually move the sun visors up and down or from the front windshield to the side windows. This course of actions inevitably distracts the driver's attention and adversely influence the driving safety, especially when driving at a high speed. Meanwhile, the occupant is only allowed to easily manipulate the sun visor in front of him. For example, it is almost impossible for the driver who is driving to move the passenger side sun visor. Moreover, it may be difficult for tall drivers to manually manipulate the sun visor due to cramped space in the cabin.

BRIEF DESCRIPTION OF THE DRAWINGS

Some of the embodiments will be described in detail, with reference to the following figures, wherein like designations denote like members, wherein.

Figure 1:
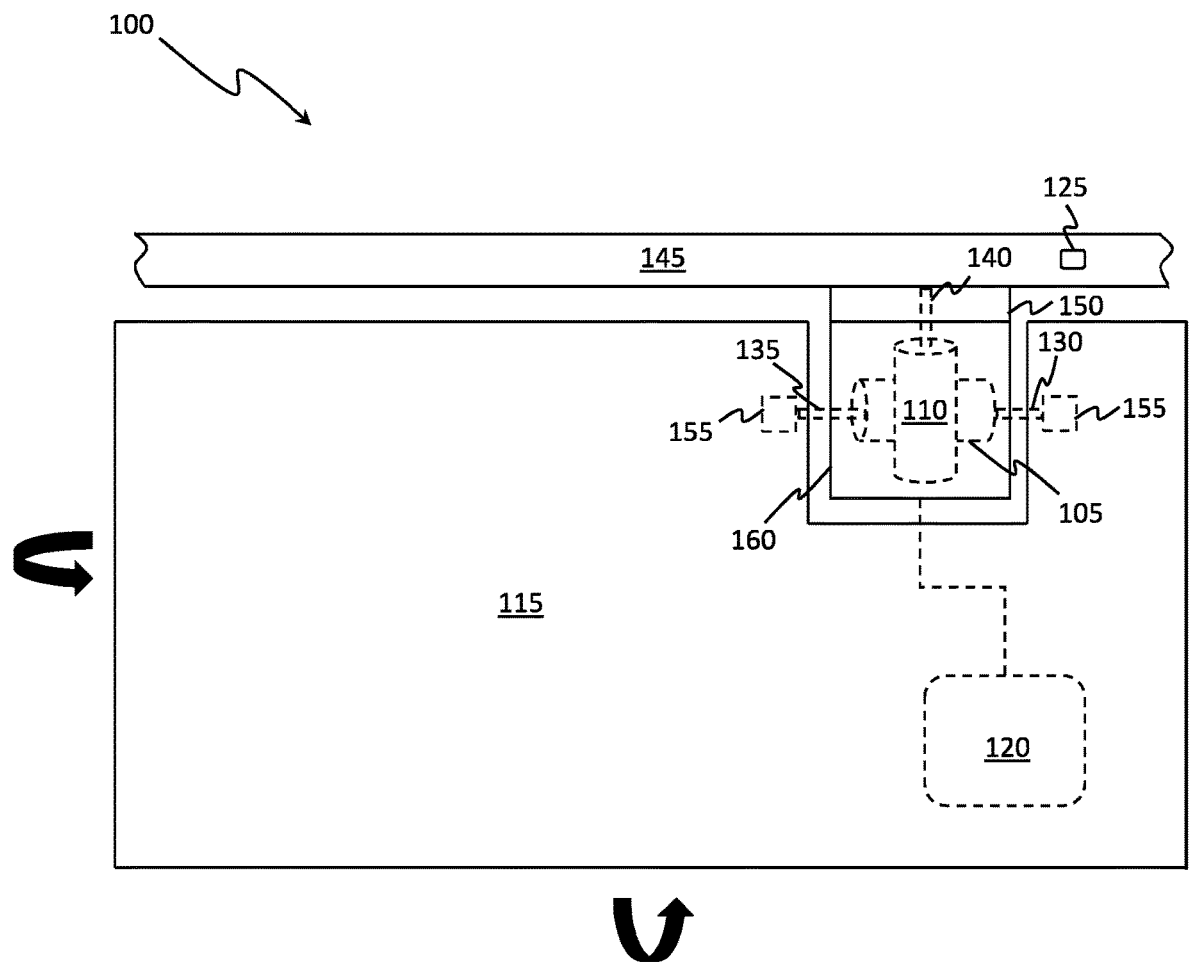
FIG. 1 illustrates a front view of a remotely operated sun visor in a first deployed state, according to some embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure. As used herein, "vehicular sun visors" and "sun visors" are used interchangeably and refer to a shade affixed above the windshield of a vehicle.

The present disclosure includes many aspects and features. Moreover, while many aspects and features relate to, and are described in the context of detection of presence of one or more intruder devices, embodiments of the present disclosure are not limited to use only in this context.

Driving in the sun may be an enjoyable experience, but it can also lead to a hazard if the driver's view is compromised by a glaring sun. This glare can make it much more difficult to see the road ahead and potential hazards, leading to an increased likelihood of accidents. Sun visor is an effective apparatus to protect the driver or front passenger from sun rays, such that the sun does not shine directly into the occupants' eyes. Almost every automobile is equipped with at least two sun visors that are positioned adjacent to a top portion of the windshield, one at the driver's side and another at the front passenger's side. Under certain lighting conditions, the driver may deploy the sun visor by rotating the sun visor about a rotational axis from a non-deployed position to a deployed position to prevent part of light transmission from entering the cabin, thereby enabling the driver to focus on vehicle operations.

However, the occupants have to manually move the sun visors up and down or from the front windshield to the side windows. This course of actions inevitably distracts the driver's attention and adversely influence the driving safety, especially when driving at a high speed. Meanwhile, the occupant is only allowed to easily manipulate the sun visor in front of him. For example, it is almost impossible for the driver who is driving to move the passenger side sun visor. Moreover, it is difficult for a tall driver to manually manipulate the sun visor due to cramped space in the cabin.

The instant disclosure seeks to provide a remotely operated sun visor that can resolve one or more of the aforementioned issues. The present disclosure seeks to reduce or eliminate driver distractions that can occur with manually operated sun visors. Furthermore, the instant disclosure seeks to provide a seamless remote operation that allows drivers to easily access the operational power switch of the remotely operated sun visor and individually rotate the visor's body up, down, left, or right. The remotely operated sun visor can be deployed or actuated electrically and/or remotely to thereby substantially eliminate or reduce manual intervention at the initiation and termination of use. The remotely operated sun visor can be mounted on existing vehicular sun visors or function as a replacement of existing visors. In other words, the remotely operated sun visor can be mounted or pre-manufactured on to an automobile as a substitute for existing visors or retrofitted onto existing vehicular sun visors.

In reference to the general configuration of the instant disclosure, FIG. 1 illustrates a front view of a remotely operated sun visor (hereinafter "ROSV"), generally 100, in a "first deployed state", according to some embodiments. The ROSV 100 is a motored sun visor that includes a first rotational mechanism 105, a second rotational mechanism 110, a sun visor body 115, a controller unit 120, and a power switch 125. In addition to the deployed state disclosed in FIG. 1, the ROSV also has a "stored state" where the sun visor body 115 is folded in towards the vehicle mounting bracket 145 (e.g., proximate to the top edge of the vehicle windshield) or towards the roof of the vehicle. For example, the vehicle mounting bracket 145 can be permanently (e.g., bolted on using fasteners) or dynamically coupled (e.g., using a clamp(s), Velcro, as well as other dynamic non-permanent fasteners) to a vehicular sun visor. In embodiments where the ROSV 100 replaces the vehicle sun visor, the vehicle mounting bracket 145 is affixed to the vehicle.

Figure 2:
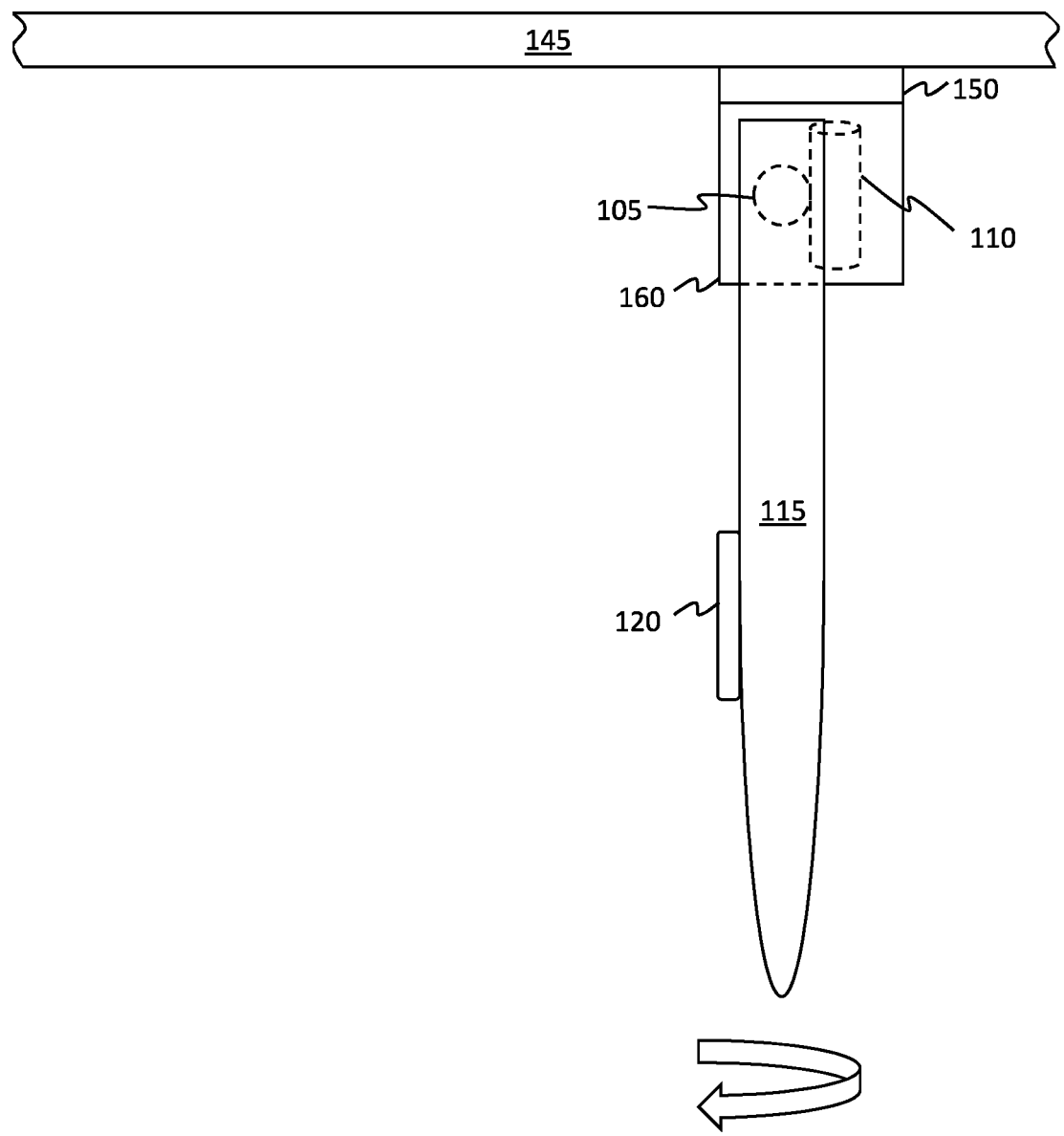
FIG. 2 illustrates a front view of the remotely operated sun visor in a second deployed state, according to other embodiments.

The first rotational mechanism 105 is preferably affixed to and oriented perpendicular to the second rotational mechanism 110. The first rotational mechanism 105 and the second rotational mechanism 110 are electric motors. The first rotational mechanism 105 and the second rotational mechanism 110 are positioned within an enclosure 160. The sun visor body 115 is torsionally coupled to the first rotational mechanism 105, which thereby rotates the sun visor body 115 about a first axis 325 (discussed further below) when activated. The vehicle mounting plate 145 is torsionally coupled to the second rotational mechanism 110, which thereby rotates the sun visor body 115 about a second axis 330 (discussed further below) when activated. FIG. 2 illustrates a front view of the ROSV 100 in a second deployed state, according to other embodiments.

Figure 3:
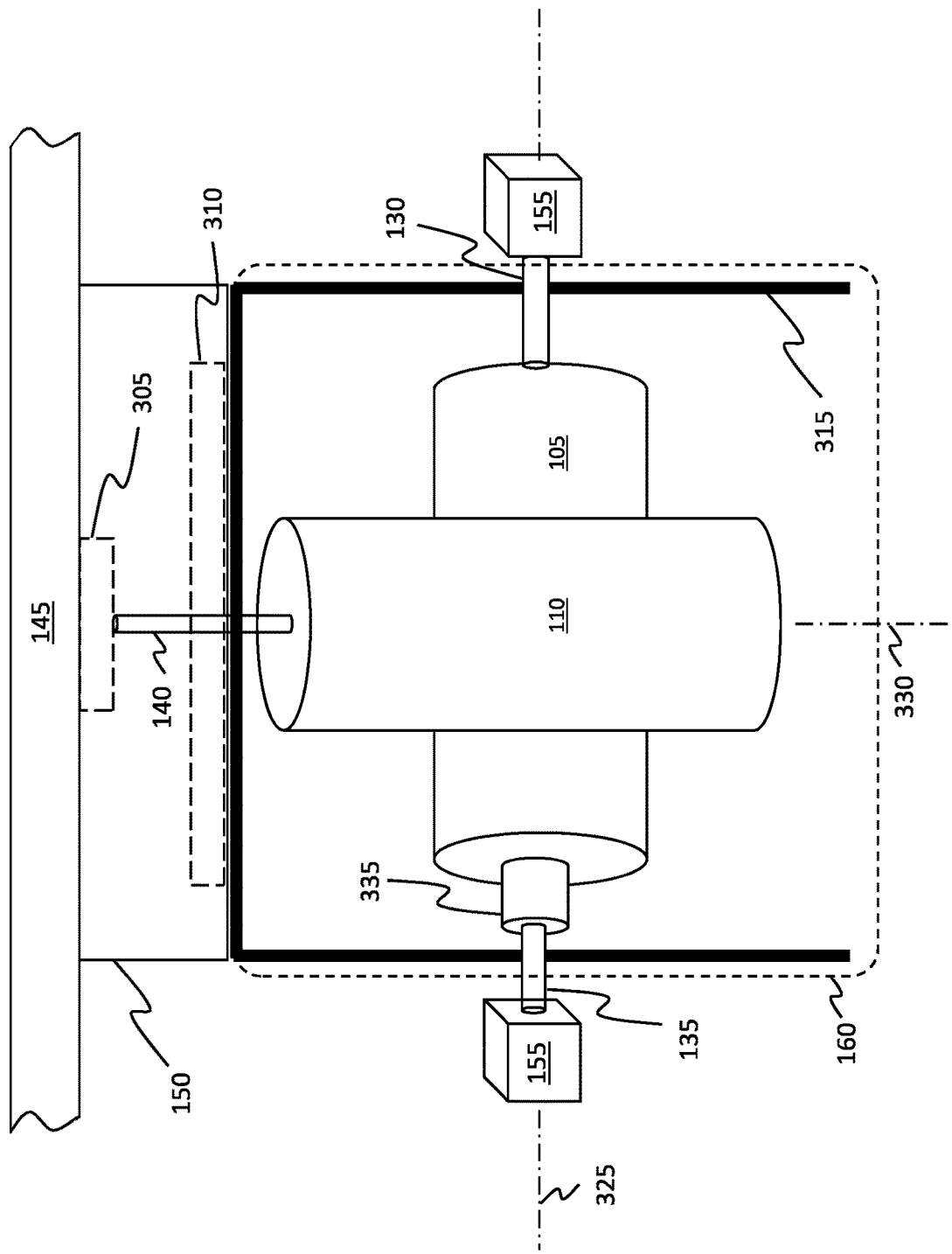
FIG. 3 illustrates internal components of a sun visor body of the remotely operated sun visor, according to certain embodiments.
Figure 8:
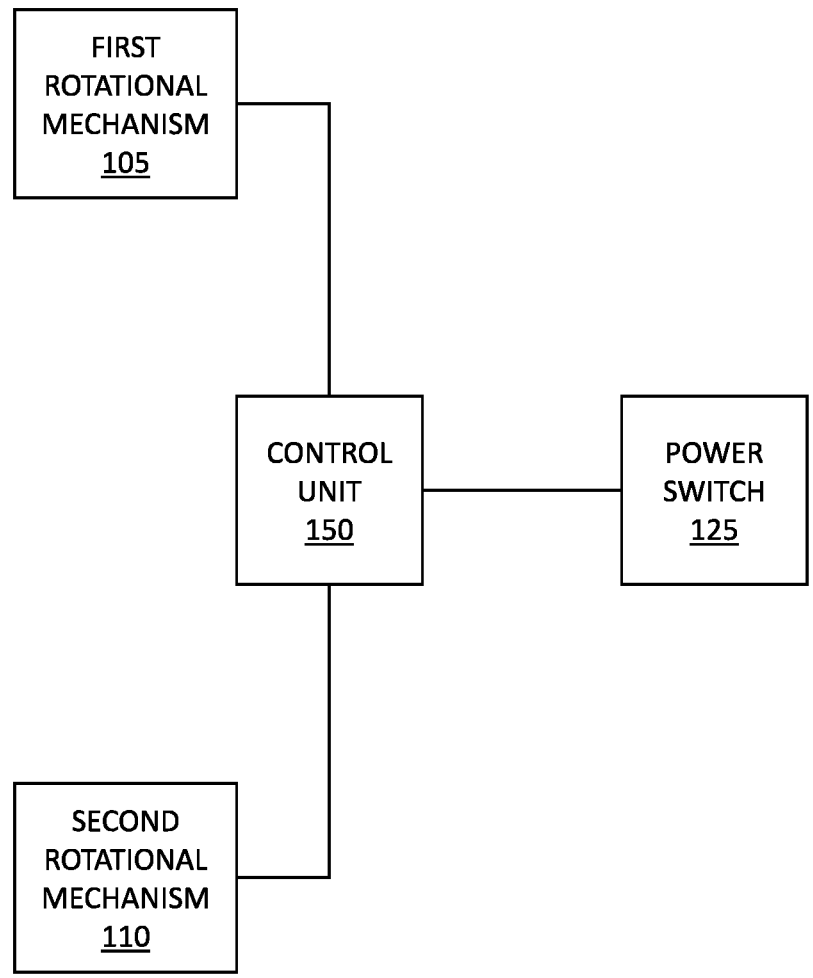
FIG. 8 illustrates a block diagram of electrical components of the remotely operated sun visor, according to yet still other embodiments.

The first axis 325 is oriented perpendicular to the second axis 330. The first rotational mechanism 105 and the second rotational mechanism 110 are each communicatively coupled to the controller unit 120 (as depicted in FIG. 8). FIG. 3 illustrates internal components of the sun visor body 115, according to certain embodiments. The first rotational mechanism 105 and the second rotational mechanism 110 are each positioned within a motor housing 315. The first rotational mechanism 105 and the second rotational mechanism 110 are perpendicularly coupled to each other. The first rotational mechanism 105 includes a first rod 130 and a second rod 135 positioned opposite the first rod 130. The second rotational mechanism 110 includes a third rod 140.

A visor drive mount 335 is coupled to the first rotational mechanism 105 opposite the first rod 130. The second rod 135 is positioned within (e.g., rotatably coupled to) the visor drive mount 335.

Figure 4:
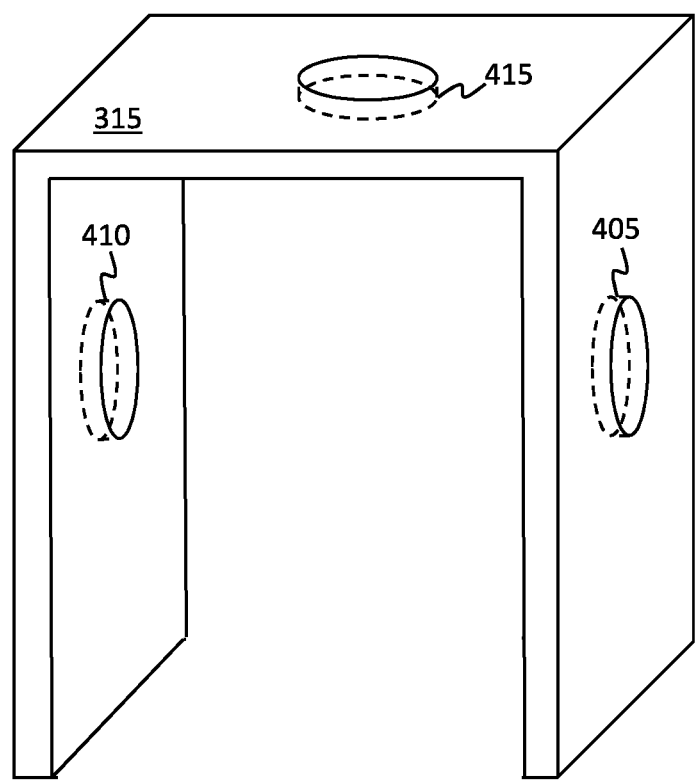
FIG. 4 illustrates a perspective view of a motor housing, according to yet still others embodiments.
Figure 5:
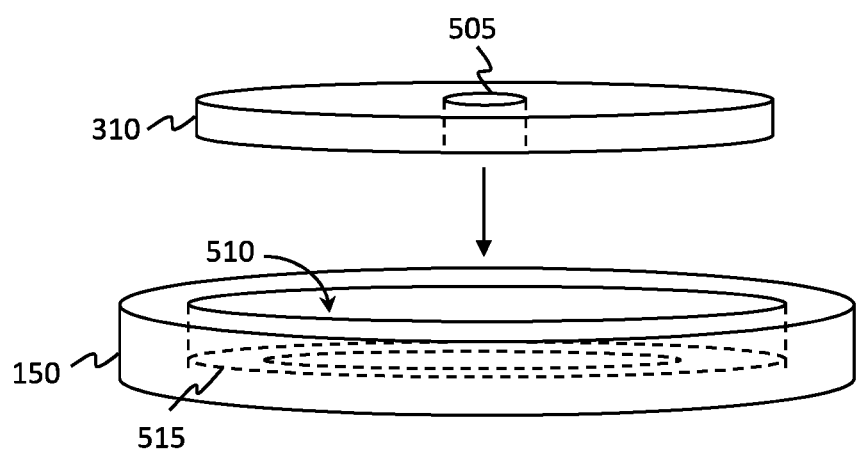
FIG. 5 illustrates a perspective view of a bearing and a bearing housing, according to some embodiments.

The second rod 135 is concentrically aligned with the visor drive mount 335. The first rod 130, the second rod 135, and the third rod 140 each extend beyond the motor housing 315. The first rod 130 and the second rod 135 are each coupled to and concentrically aligned with visor idler mounts 155. The sun visor body 115 is coupled to the visor idler mounts 155. The third rod 140 is torsionally coupled to the vehicle mounting bracket 145. FIG. 4 illustrates a perspective view of the motor housing 315, according to yet still others embodiments. The motor housing 315 includes an orifice 405, an orifice 410, and an orifice 415. The first rod 130, the second rod 135, and the third rod 140 each extend beyond the orifice 405, the orifice 410, and the orifice 415, respectively. FIG. 5 illustrates a perspective view of a bearing, generally 310, and a bearing housing, generally 150, according to some embodiments. The bearing 310 is preferably a planar disk-shaped component that includes a bearing orifice 505. The bearing housing 150 is a structure that includes void space 510 and lip 515. The bearing orifice 505 is concentrically aligned with the third rod 140 and the void space 510.

Figure 6:
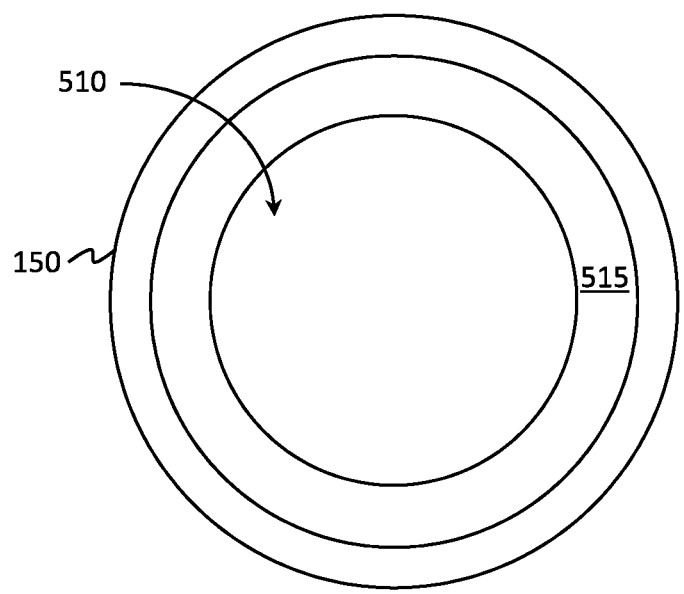
FIG. 6 illustrates a top view of a bearing housing, according to other embodiments.
Figure 7:
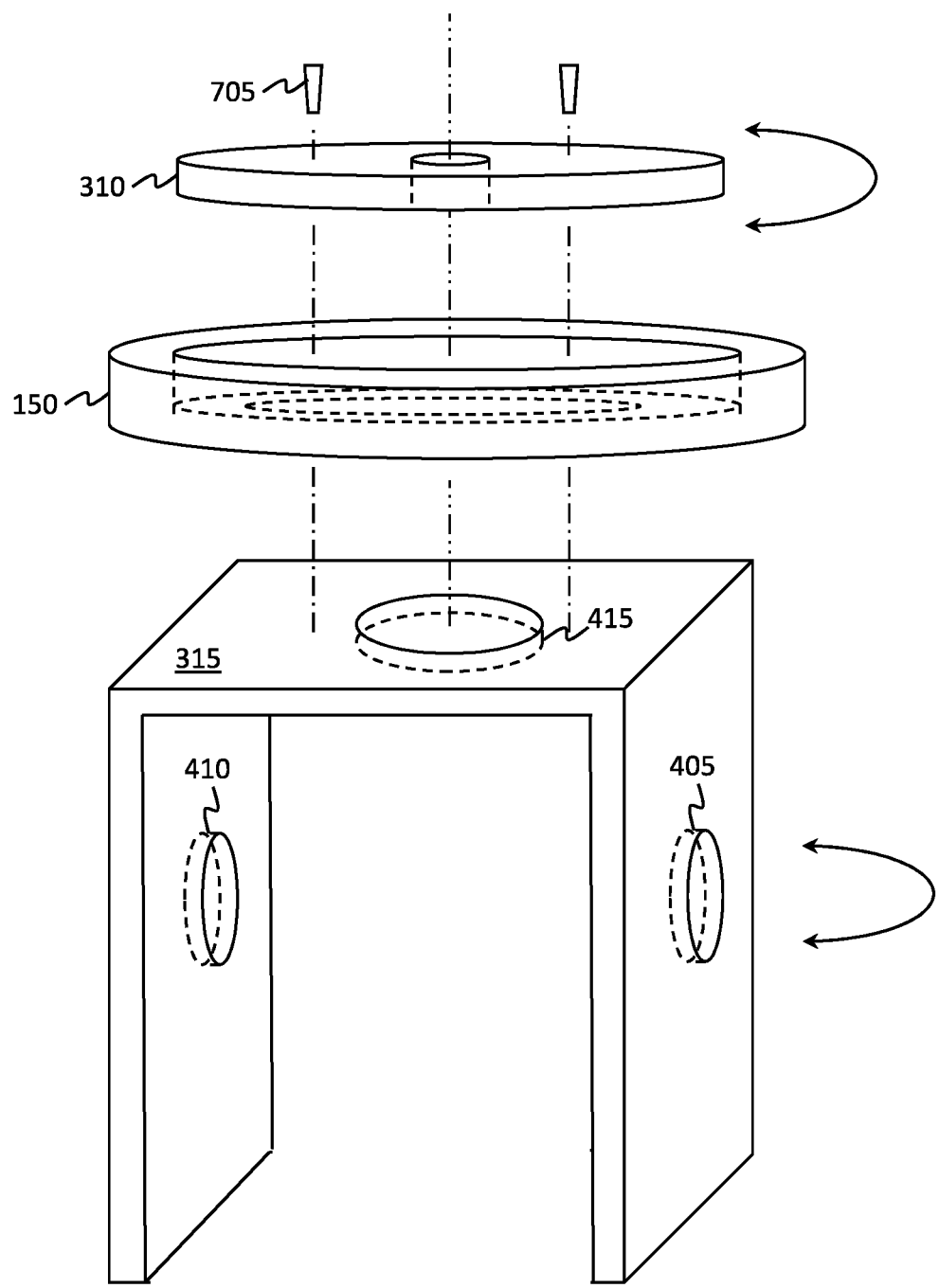
FIG. 7 illustrates a perspective view of the assembly of the bearing, the bearing housing, and the motor housing, according to certain embodiments.

The bearing 310 rests on the lip 515 when the ROSV is assembled. The bearing 310 is positioned in and rotates independent of the bearing housing 150. FIG. 6 is a top view of the bearing housing 150 that shows the lip 515 and the void space 510. The bearing 310 is positioned on the lip 515, which provides structural integrity. FIG. 7 illustrates a perspective view of the assembly of the bearing 310, the bearing housing 150, and the motor housing 315, according to certain embodiments. The bearing housing 150 is coupled to the vehicle mounting bracket 145. The third rod 140 is coupled to a motor shaft adapter 305, which is coupled to the vehicle mounting bracket 145. The bearing 310 is positioned within the bearing housing 150. The bearing 310 is preferably coupled to the motor housing 315 (e.g., via the fasteners 705). The bearing 310 is concentrically aligned with the third rod 140 and the second rotational mechanism 110. The bearing 310 rotates with motor housing 315 when the second rotational mechanism 105 is activated.

Figure 9:
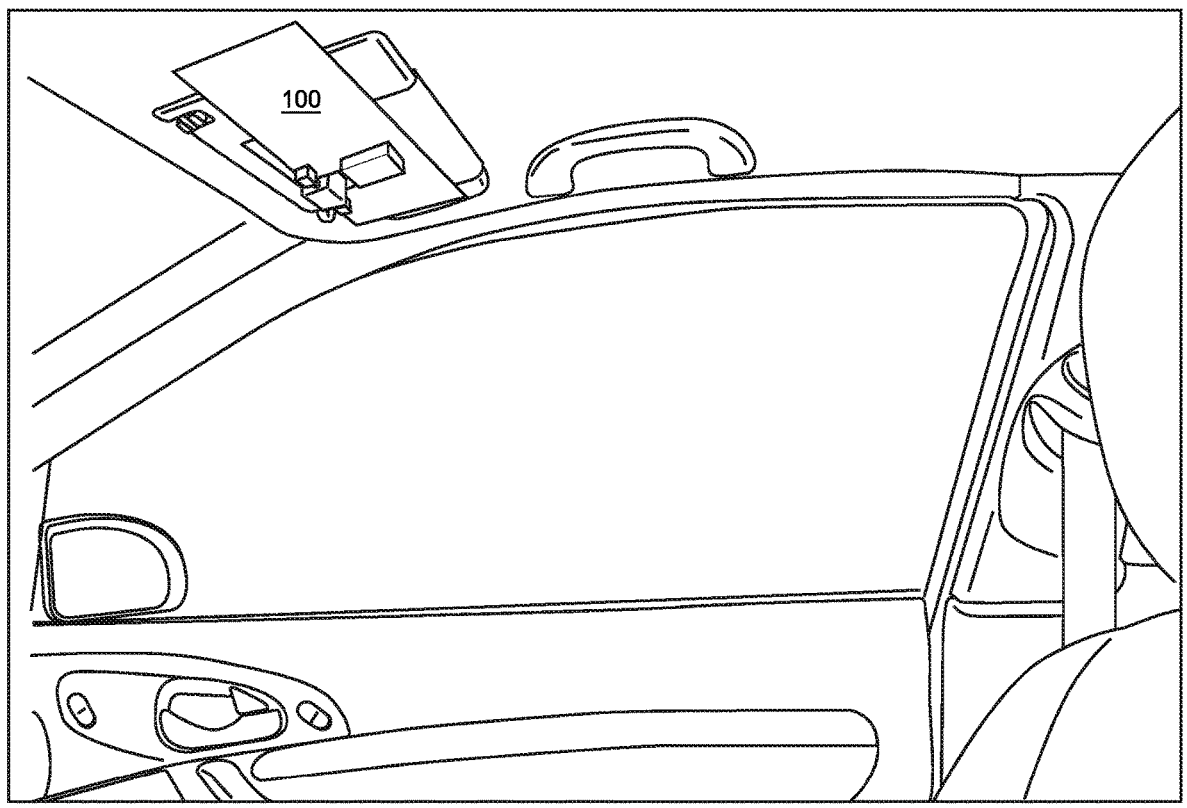
FIG. 9 illustrates the remotely operated sun visor of FIG. 1 in a "stored state", according to some embodiments.
Figure 10:
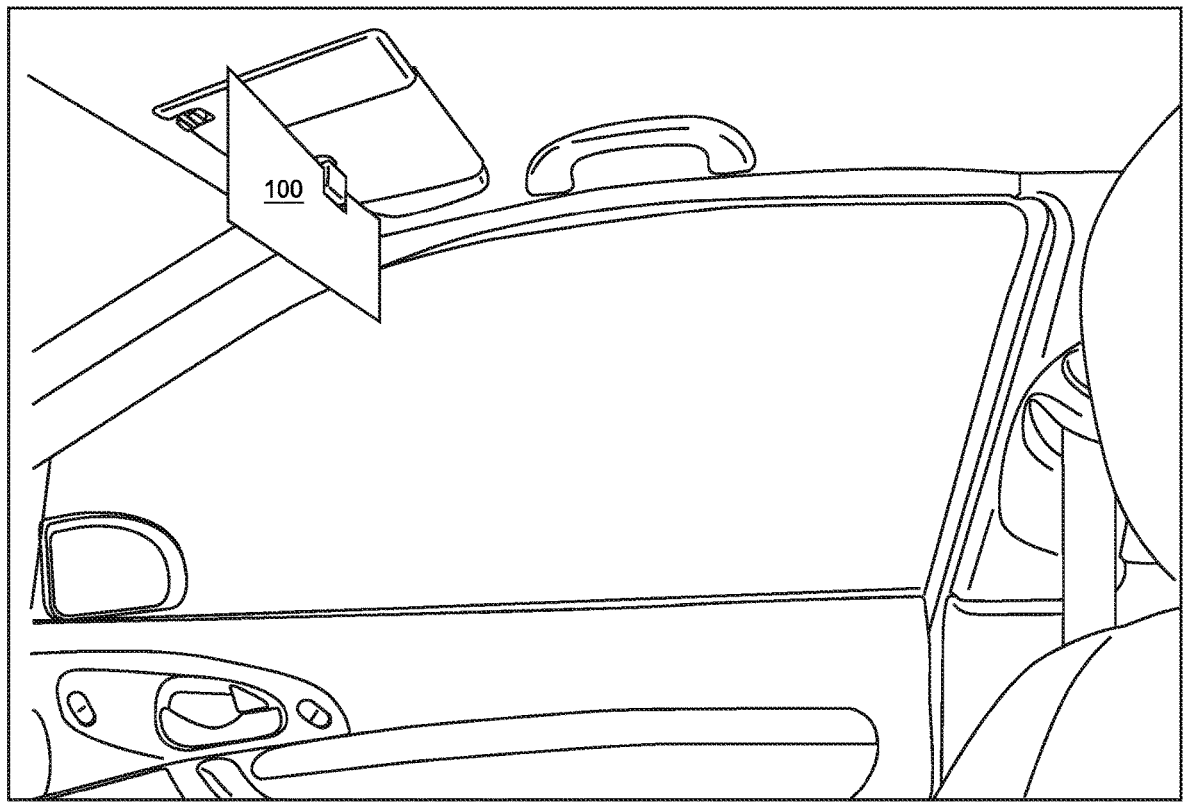
FIG. 10 illustrates the remotely operated sun visor in a "first deployed state", according to other embodiments.
Figure 11:
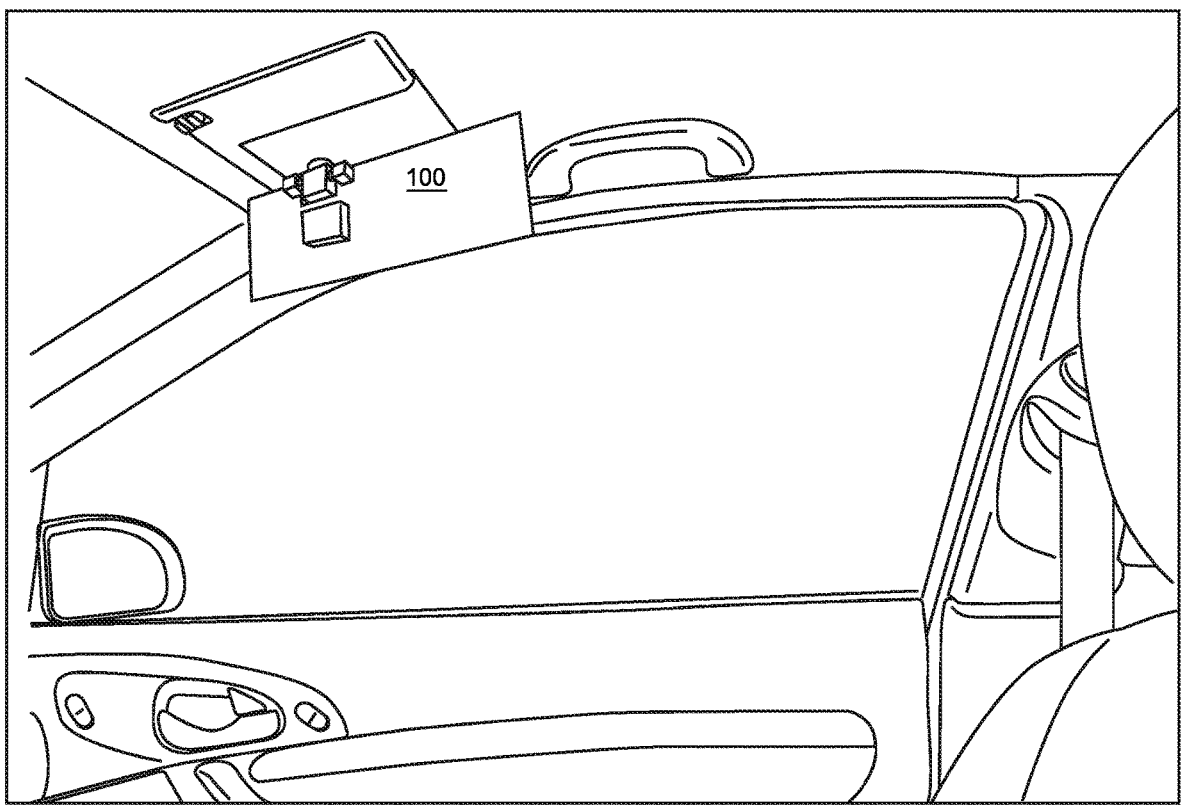
FIG. 11 illustrates the remotely operated sun visor in a "second deployed state", according to certain embodiments.

In reference to FIG. 8, the controller unit 120 processes driver inputs that are received through the power switch 125 and outputs timing and control signals to the first rotational mechanism 105 and the second rotational mechanism 110. The power switch 125 is an electronic unit that allows drivers to remotely operate the first rotational mechanism 105 and the second rotational mechanism 110. In some embodiments, the power switch 125 is a separate unit that mounts to the control panel or dashboard of the vehicle. On other embodiments, the power switch 125 is integrated within the existing controls of the vehicle. In yet still other embodiments, the power switch 125 and/or the control unit 120 is electronically coupled to the vehicle's battery. FIGS. 9-11 illustrate the ROSV 100 in a "stored state", "first deployed state", and "second deployed state", according to certain embodiments, Although the disclosure has been explained in relation to its preferred embodiment, it is to be understood that many other possible modifications and variations can be made without departing from the spirit and scope of the disclosure.

What is claimed is:

1. A remotely operated sun visor, comprising:
    a first rotational mechanism;
    a second rotational mechanism;
    a sun visor body;
    a controller unit;
    a power switch;
    wherein
        the first rotational mechanism is affixed to and oriented perpendicular to the second rotational mechanism;
        the sun visor body is torsionally coupled to the first rotational mechanism which thereby rotates the sun visor body about a first axis when activated;
        a vehicle mounting plate is torsionally coupled to the second rotational mechanism, which thereby rotates the sun visor body about a second axis when activated;
        the first axis is oriented perpendicular to the second axis;
        the first rotational mechanism and the second rotational mechanism are each communicatively coupled to the controller unit;
        the first rotational mechanism and the second rotational mechanism are positioned within a motor housing;
        the first rotational mechanism comprises a first rod and a second rod positioned opposite the first rod; and
        the second rotational mechanism comprises a third rod.

2. The remotely operated sun visor of claim 1, further comprising:
    a visor drive mount coupled to the first rotational mechanism opposite the first rod.

3. The remotely operated sun visor of claim 2, further comprising:
    a motor housing; and
    wherein
        the first rotational mechanism and the second rotational mechanism are each positioned within the motor housing.

4. The remotely operated sun visor of claim 3, wherein the first rod, the second rod, and the third rod each extend beyond the motor housing.

5. The remotely operated sun visor of claim 4, wherein the second rod is positioned within the visor drive mount.

6. The remotely operated sun visor of claim 5, wherein the first rod and the second rod are each coupled to and concentrically aligned with a visor idler mount; and
the sun visor body is coupled to the visor idler mounts.

7. The remotely operated sun visor of claim 6, further comprising:
    a vehicle mounting bracket;
    a motor shaft adapter;
    wherein
        the third rod is coupled to the motor shaft adapter; and
        the motor shaft adapter is coupled to the vehicle mounting bracket.

8. The remotely operated sun visor of claim 7, further comprising:
    a bearing housing; and
    wherein
        the bearing housing is coupled to the vehicle mounting bracket.

9. The remotely operated sun visor of claim 8, further comprising:
    a bearing positioned within the bearing housing;
    wherein
        the bearing is coupled to the motor housing;
        the bearing is concentrically aligned with the third rod and the second rotational mechanism; and
        the bearing rotates with the motor housing when the second rotational mechanism is activated.

10. A remotely operated sun visor, comprising;
a first rotational mechanism;
a second rotational mechanism;
a sun visor body;
a controller unit;
a power switch;
wherein
  the first rotational mechanism is affixed to and oriented perpendicular to the second rotational mechanism;
  the sun visor body is torsionally coupled to the first rotational mechanism which thereby rotates the sun visor body about a first axis when activated;
  a vehicle mounting plate is torsionally coupled to the second rotational mechanism, which thereby rotates the sun visor body about a second axis when activated;
  the first axis is oriented perpendicular to the second axis;
  the first rotational mechanism and the second rotational mechanism are each communicatively coupled to the controller unit;
  the first rotational mechanism and the second rotational mechanism are positioned within a motor housing;
  the first rotational mechanism comprises a first rod and a second rod positioned opposite the first rod; and
  the second rotational mechanism comprises a third rod.

11. The remotely operated sun visor of claim 10, further comprising:
  a visor drive mount coupled to the first rotational mechanism opposite the first rod.

12. The remotely operated sun visor of claim 11, further comprising:
  a motor housing; and
  wherein the first rotational mechanism and the second rotational mechanism are each positioned within the motor housing.

13. The remotely operated sun visor of claim 12, wherein the first rod, the second rod, and the third rod each extend beyond the motor housing.

14. The remotely operated sun visor of claim 13, wherein the second rod is positioned within the visor drive mount.

15. The remotely operated sun visor of claim 14, wherein the first rod and the second rod are each coupled to and concentrically aligned with a visor idler mount; and
  the sun visor body is coupled to the visor idler mounts.

16. The remotely operated sun visor of claim 15, further comprising:
  a vehicle mounting bracket;
  a motor shaft adapter;
  wherein
    the third rod is coupled to the motor shaft adapter; and
    the motor shaft adapter is coupled to the vehicle mounting bracket.

17. The remotely operated sun visor of claim 16, further comprising:
  a bearing housing;
  wherein
    the bearing housing is coupled to the vehicle mounting bracket.

18. The remotely operated sun visor of claim 17, further comprising:
  a bearing positioned within the bearing housing;
  wherein
    the bearing is coupled to the motor housing;
    the bearing is concentrically aligned with the third rod and the second rotational mechanism; and
    the bearing rotates with the motor housing when the second rotational mechanism is activated.

19. A remotely operated sun visor, comprising;
a first rotational mechanism;
a second rotational mechanism;
a sun visor body;
a controller unit;
a power switch;
a visor drive mount coupled to the first rotational mechanism opposite the first rod;
a motor housing;
wherein
  the first rotational mechanism is affixed to and oriented perpendicular to the second rotational mechanism;
  the sun visor body is torsionally coupled to the first rotational mechanism which thereby rotates the sun visor body about a first axis when activated;
  a vehicle mounting plate is torsionally coupled to the second rotational mechanism, which thereby rotates the sun visor body about a second axis when activated;
  the first axis is oriented perpendicular to the second axis;
  the first rotational mechanism and the second rotational mechanism are each communicatively coupled to the controller unit;
  the first rotational mechanism and the second rotational mechanism are positioned within a motor housing;
  the first rotational mechanism comprises a first rod and a second rod positioned opposite the first rod;
  the second rotational mechanism comprises a third rod;
  the first rotational mechanism and the second rotational mechanism are each positioned within the motor housing; and
  the first rod, the second rod, and the third rod each extend beyond the motor housing.

* * * * *